Figure 11:
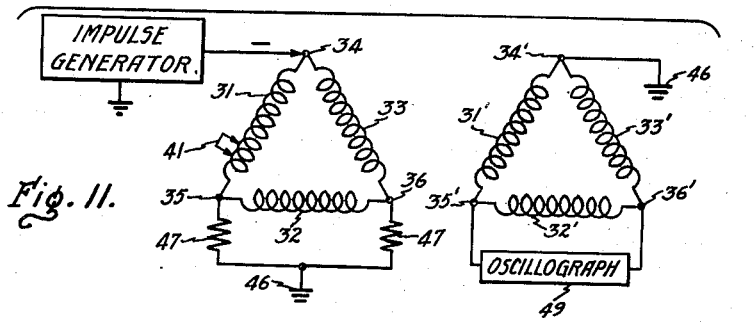

June 9, 1959  J. E. HOLCOMB  2,890,410
IMPULSE TESTING
Filed June 27, 1955  3 Sheets-Sheet 1
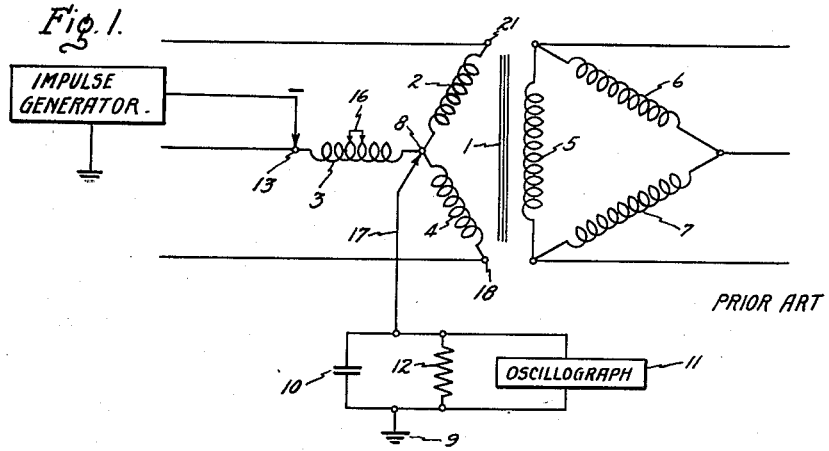
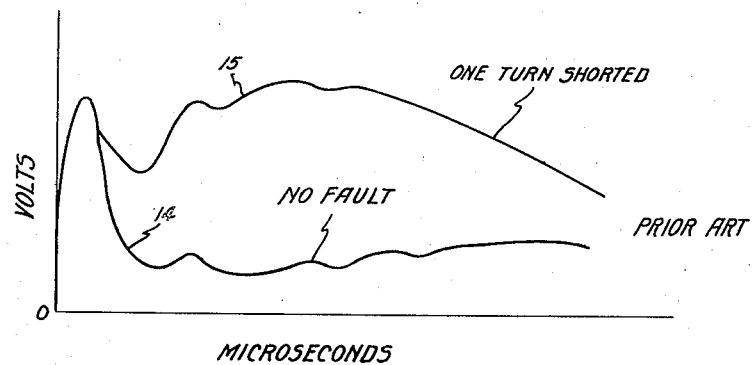
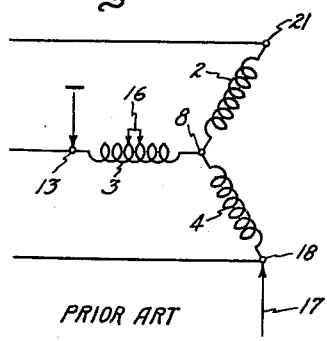
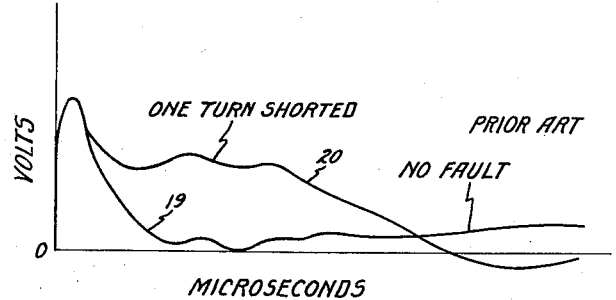
Inventor
James E. Holcomb,
by Gilbert P. Tarleton
His Attorney.

June 9, 1959  J. E. HOLCOMB  2,890,410
IMPULSE TESTING
Filed June 27, 1955  3 Sheets-Sheet 2
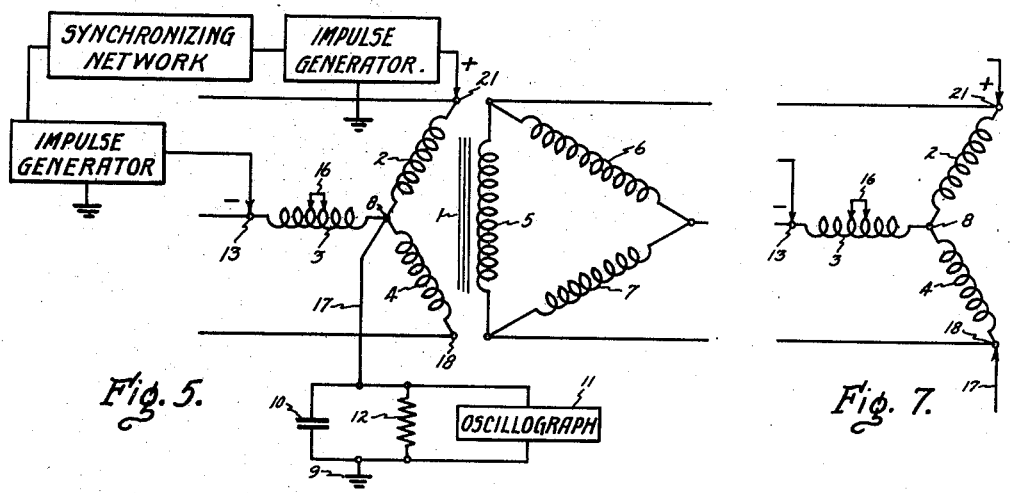
Fig. 5.   Fig. 7.
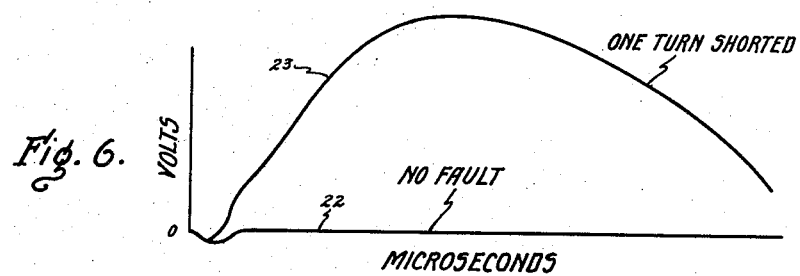
Fig. 6.
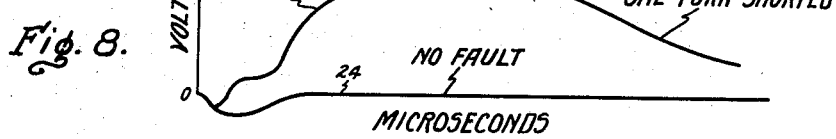
Fig. 8.
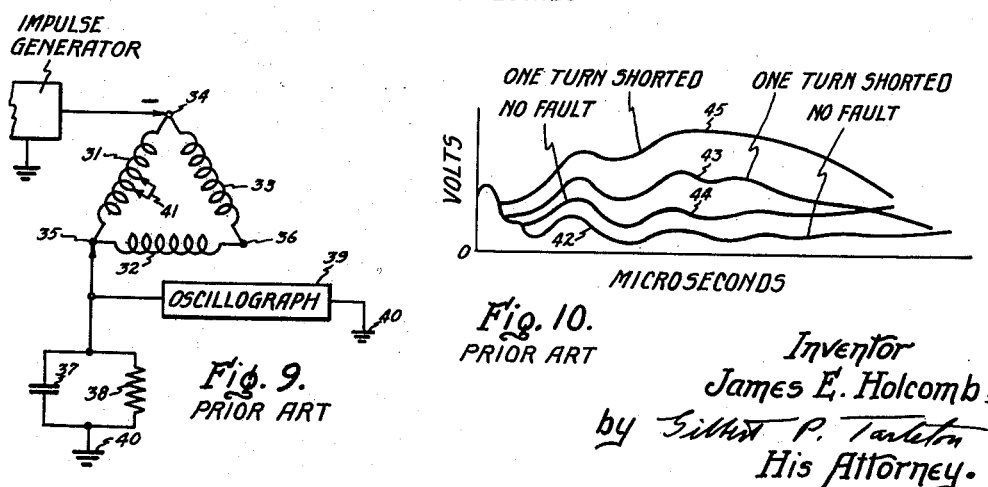
Fig. 9.
PRIOR ART
Fig. 10.
PRIOR ART
Inventor
James E. Holcomb,
by Gilbert P. Tarleton
His Attorney.

June 9, 1959  J. E. HOLCOMB  2,890,410
IMPULSE TESTING
Filed June 27, 1955  3 Sheets-Sheet 3

Inventor
James E. Holcomb.
by Gilbert P. Tarleton
His Attorney.

United States Patent Office 2,890,410
Patented June 9, 1959

2,890,410

IMPULSE TESTING

James E. Holcomb, Lanesboro, Mass., assignor to General Electric Company, a corporation of New York Application June 27, 1955, Serial No. 517,964

12 Claims. (Cl. 324—54)

This invention relates to impulse testing, and more particularly, to an improved method for detecting impulse produced failures in three phase insulated electrical windings.

The ability of a transformer winding to withstand voltage surges when in service is tested by applying to it a steep front voltage impulse from any suitable source, such as a well known impulse generator. In my joint Patent 2,479,426, issued August 16, 1949, and assigned to the same assignee as the instant patent application is disclosed apparatus and a method for impulse testing single phase distribution transformers. An impulse generator is caused to apply a voltage wave of predetermined and generally standardized steepness and height to a transformer winding, and the current wave produced by this impulse is in effect measured by recording the voltage drop across a capacitor connected in series with said winding on an oscillograph connected in parallel with said capacitor. The resulting oscillogram is compared with another oscillogram taken when a duplicate transformer which was known not to have a fault was tested under identical conditions. A comparison of the two oscillograms will indicate whether or not there has been a failure.

The apparatus and method disclosed in Patent 2,479,426 can be used for impulse testing three phase distribution transformers. However, as will be shown in greater detail hereinafter, my present invention provides an improved and more sensitive method of impulse testing the insulated electrical windings of three phase distribution transformers.

An object of this invention is to provide an improved and more sensitive method for detecting impulse produced failures in three phase insulated electrical windings.

A further object of this invention is to provide an improved and more sensitive method for detecting impulse produced failures in the insulated electrical windings of three phase distribution transformers.

In my invention impulses of equal voltage and wave shape are applied to two identical high voltage windings of a three phase distribution transformer. The voltages in the stressed windings or the voltages induced in two of the low voltage windings are balanced one against the other when the stressed windings are symmetrical or when there is no fault in the stressed windings. However, when there is a fault there will be an unbalance. Such method of impulse testing can probably be applied to other types of three phase electrical apparatus besides three phase distribution transformers.

My invention will be better understood from the following description taken in connection with the accompanying drawings, and its scope will be pointed out in the appended claims.

Figure 12:
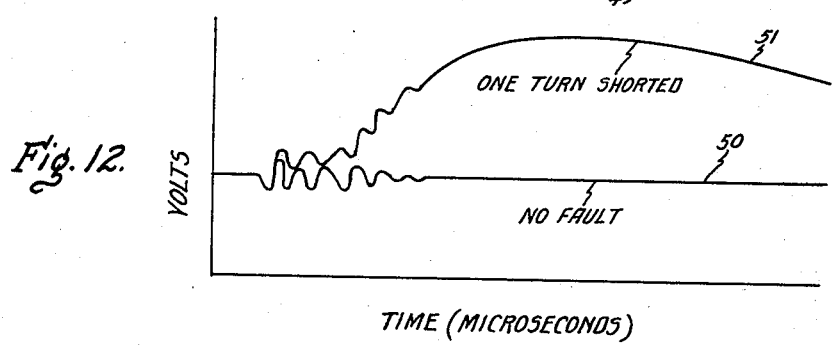
Figure 13:
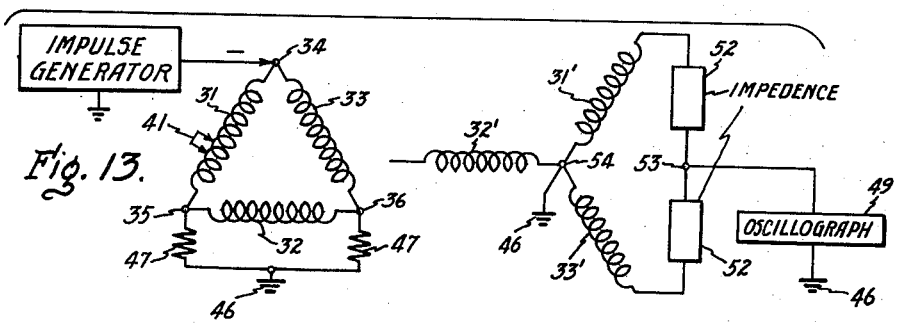
Figure 14:
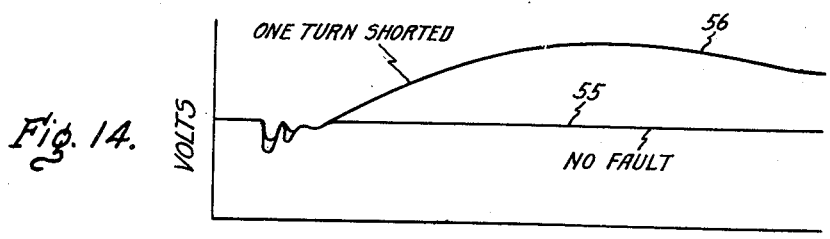

In the drawings, Fig. 1 is a diagrammatic illustration of apparatus and a method of impulse testing the windings of a three phase distribution transformer in accordance with the teachings of Patent 2,479,426 when the high voltage windings are Y-connected and the neutral thereof is accessible. Fig. 2 is an oscillogram obtained with the apparatus and method of Fig. 1. Fig. 3 is a diagrammatic illustration of a method of impulse testing the same three phase distribution transformer in accordance with Patent 2,479,426 when the neutral thereof is inaccessible. Fig. 4 is an oscillogram obtained with the method of Fig. 3. Fig. 5 is a diagrammatic illustration of a method of impulse testing the same three phase distribution transformer in accordance with my present invention when the neutral thereof is accessible. Fig. 6 is an oscillogram obtained with the method of Fig. 5. Fig. 7 is a diagrammatic illustration of a method of impulse testing the same three phase distribution transformer in accordance with my present invention when the neutral is inaccessible. Fig. 8 is an oscillogram obtained with the method of Fig. 7. Fig. 9 is a diagrammatic illustration of apparatus and a method of impulse testing the windings of the same three phase distribution transformer in accordance with the teachings of Patent 2,479,426 when the high voltage windings are delta-connected. Fig. 10 is an oscillogram obtained with the apparatus and method of Fig. 9. Fig. 11 is a diagrammatic illustration of apparatus and a method of impulse testing the windings of the same three phase distribution transformer in accordance with my present invention when the high and low voltage windings are delta-connected. Fig. 12 is an oscillogram obtained with the apparatus and method of Fig. 11. Fig. 13 is a diagrammatic illustration of apparatus and a method of impulse testing the windings of the same three phase distribution transformer in accordance with my present invention when the high voltage windings are delta-connected and the low voltage windings are Y-connected. Fig. 14 is an oscillogram obtained with the apparatus and method of Fig. 13. Identical parts throughout the various figures are assigned like reference numerals.

Referring now to the drawings, and more particularly to Fig. 1, illustrated therein is a three phase distribution transformer comprising a magnetic core 1, three high voltage windings 2, 3, and 4; and three low voltage windings 5, 6, and 7. The high voltage windings 2, 3, and 4 are Y-connected, and the low voltage windings 5, 6, and 7 are delta-connected. Series connected between the neutral terminal 8 of the Y 2, 3, and 4 and ground 9 by a line 17 is a capacitor 10. Connected in parallel with capacitor 10 to measure and preferably also record the voltage across the capacitor 10 is any suitable device 11, such as a cathode ray oscillograph. For controlling the voltage across the capacitor 10 and also for discharging the capacitor 10 between tests of transformers is a resistor 12 in shunt therewith. An impulse generator of any suitable type which has a grounded terminal is connected at its other terminal to terminal 13 of phase winding 3. When the impulse generator creases a negative 1.5 by 40 microsecond voltage wave at terminal 13 under no fault conditions and under one turn fault conditions oscillogram curves 14 and 15 respectively of Fig. 2 are obtained. By a 1.5 by 40 microsecond voltage wave is meant a voltage wave which reaches a crest value from zero in about 1.5 microseconds and then decreases to about ½ crest value in about 40 microseconds. Using such a voltage wave for impulse testing is well known and recommended by NEMA (National Electrical Manufacturers Association) and ASA (American Standards Association). One turn fault conditions were simulated in phase winding 3 by placing a shunt 16 across one turn thereof.

The just described method of applying negative 1.5 by 40 microsecond waves to one leg of the Y and measuring voltage across an impedance connected from the neutral to ground is similar to the procedure employed in Patent 2,479,426 when impulsing single-phase transformers. The one turn fault sensitivity measured and shown in curve 15 of Fig. 2 with respect to the no fault curve 14 is fair. However, since the neutral point 8 on many three phase transformers is inaccessible, the impedance 10, 12 must sometime be connected from a second leg of the Y, such as leg 4, to ground 9. Such an arrangement is illustrated in Fig. 3, and is identical to the arrangement Fig. 1 except that in Fig. 3, the grounded parallel capacitor, resistance, and oscillograph circuit portion 10, 12, 11 is connected by lead 17 to terminal 18 of leg 4 instead of to neutral terminal 8 as in Fig. 1.

No fault and one turn fault oscillographic curves for the arrangement of Fig. 3 are shown at 19 and 20 respectively of Fig. 4. It will be apparent by comparing Figs. 4 and 2 that the sensitivity obtained with the method of Fig. 3 is not as good as that obtained with the method of Fig. 1.

To obtain more sensitive impulse testing in my invention I provide the methods of Figs. 5 and 7 for accessible and inaccessible neutrals 8 respectively. In the method of Fig. 5 impulses of opposite polarity and equal voltage and wave shape are simultaneously applied to two identical legs of the Y instead of just a single impulse to a single leg of the Y. Thus, in the method of Fig. 5 negative and positive 1.5 by 40 microsecond waves are simultaneously applied to the terminals 13 and 21 respectively of the legs 3 and 2 respectively by two impulse generators simultaneously triggered by a synchronizing network in a manner well known to those skilled in the art, while the winding leg 4 or terminal 18 is isolated from ground. With such a method of impulse testing oscillographic curves 22 and 23 of Fig. 6 were obtained for no fault and one turn fault conditions respectively.

In the method of Fig. 7, opposite impulse waves are applied as in the method of Fig. 5, but in Fig. 7 line 17 is connected to terminal 18 as in Fig. 3 due to the inaccessible neutral 8. No fault and one turn fault oscillogram curves for the method of Fig. 7, are illustrated at 24 and 25, respectively of Fig. 8. As shown by Figs. 6 and 8, due to the cancellation of the two waves of opposite polarity, the voltage at the neutral 8 of Fig. 5 and the voltage at the terminal 18 of Fig. 7 will be zero when there is no fault in the two impulsed winding phases. However, a fault in either of the two impulsed winding phases will cause an unbalance at the neutral 8 of Fig. 5 or terminal 18 of Fig. 7. Also, by comparing Figs. 6 and 8 with Figs. 2 and 4 respectively it will be clear that impulse fault detection sensitivity for three phase Y-connected distribution transformers is greatly improved by using simultaneous positive and negative impulse waves with identical wave shapes.

In the methods of Figs. 5 and 7 the impedance 10, 12 can be omitted. That is any voltage sensitive device such as oscillograph 11 alone connected between terminals 8 or 18 and ground would differentiate between fault voltage and zero no fault voltage. However, by using a paralleled capacitor and resistor the one turn fault sensitivity shown in Figs. 6 and 8 can be varied substantially by changing the impedance. The no fault signal would not change because cancellation of the two waves still occurs. The sensitivity therefore in my invention is controllable. In contrast, the sensitivity of a one turn fault when impulsing with one wave is substantially the same. Any increase in the fault signal by a change in impedance results in a proportional increase in the no fault signal as well.

In the method of Fig. 5 after the winding legs 2 and 3 are tested, the winding leg 4 can be tested by repeating the test with either leg 2 or 3. That is, winding leg 4 can be tested by simultaneously applying equal negative and positive waves to leg 4 and either of legs 2 and 3. The same applies to the method of Fig. 7.

Referring now to Fig. 9, illustrated therein is a prior art method of impulse testing a three phase distribution transformer when the high voltage windings 31, 32, and 33 thereof are delta-connected at the terminals 34, 35 and 36. Parallel connected capacitor 37, resistor 38, and oscillograph 39 are disposed between terminal 35 and ground 40. One turn of the leg 31 is shorted by shunt 41 to simulate one turn fault conditions. When a 1.5 by 40 microsecond wave was applied to terminal 34, no fault and one turn fault oscillograph curves 42 and 43 respectively of Fig. 10 were first obtained. By changing the impedance additional no fault and one turn fault curves 44 and 45, of Fig. 10 were obtained.

In order to improve the fault detection sensitivity in delta-connected windings my invention applies the cancellation principle of fault detection to delta-connected windings. The simultaneous negative and positive wave method cannot be employed with delta-connected windings because one leg thereof would be subjected to a voltage twice normal. However, if either a negative or positive wave is applied to one terminal of a high voltage delta, the induced voltage in two low voltage winding legs can be balanced to give a more sensitive fault detection method.

Thus, in Fig. 11 a negative impulse wave is applied to one end of two high voltage winding legs 31 and 33 at terminal 34. Series connected between each of the other ends or terminals 35 and 36 of the two winding legs 31 and 33 respectively and ground 46 are equal impedances 47. The low voltage or secondary winding legs 31', 32' and 33' are delta-connected at terminals 34', 35', and 36'. Terminal 34' is connected to ground 46, but this is not absolutely necessary, and an oscillograph 49 is connected in shunt relationship with winding leg 32' at terminals 35' and 36'.

The voltage across the two windings 31 and 33 will be equal and there will be zero voltage between the terminals 35 and 36 if there is no fault in either of the two windings 31 and 33. Also, the induced voltages in legs 31' and 33' will be equal whereby there will be zero voltage between terminals 35' and 36'. However, if there is a fault in either of windings 31 or 33, as for instance in winding 31 as indicated by the shunt 41 shorting one turn of the leg 31, the induced voltages across the windings 31' and 33' will not be equal and the voltage between the terminals 35' and 36' will change from zero.

When a negative 1.5 by 40 microsecond wave was applied to terminal 34 no fault and one turn fault oscillograph picture curves 50 and 51 respectively were obtained at oscillograph 49. Making equal changes in the impedances 47 will not alter the no fault oscillograph picture curve 50 but will alter the one turn fault oscillograph picture curve from 51.

In the method of Fig. 13 which is applicable to delta-connected high voltage windings and Y connected low voltage windings equal impedances 52 are connected to each other at one of their ends at terminal 53 and at their other ends are connected to the outer ends of winding legs 31' and 33'. The neutral terminal 54 of the Y is connected to ground 46, and oscillograph 49 is connected at terminal 53 between impedances 52 and ground 46; however, oscillograph could also be connected at its grounded side directly to neutral terminal 54. When there is no fault in stressed windings 31 and 33 equal but opposite voltages will be induced in windings 31' and 33' providing there is also no fault therein and zero voltage will appear at terminal 53. However if there is a fault in either of windings 31', 33' or 31, 33, as in windings 31 due to the one turn shunt 41, unequal voltages will be induced in windings 31' and 33' whereby the voltage at terminal 53 will be other than zero. No fault and one turn fault oscillograph curves for the method of Fig. 13 are shown at 55 and 56 respectively of Fig. 14.

By comparing Figs. 12 and 14 and 10 it will be seen that my method of impulse testing delta-connected windings is more sensitive than that of the prior art. That is, fault detection sensitivity for three phase high voltage delta-connected windings of distribution transformers can be greatly improved by simultaneously impulsing two of the high voltage windings with one negative or positive wave and balancing the induced voltages in the high and low voltage windings. Also, with my method the ratio between the fault signal and no fault signal can be substantially increased by changing the impedance, which is not true of the prior art method of Fig. 9.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A method of impulse testing three identical insulated electrical windings connected together in Y-relationship, said method comprising connecting the neutral of said Y relationship to ground through a voltage sensitive device, isolating the outer end of one of said windings from ground, and then simultaneously applying impulses of opposite polarity and equal voltage and wave shape to the outer ends of the other two of said windings, and then isolating the outer end of one of said other two windings from ground and simultaneously applying impulses of opposite polarity and equal voltage and wave shape to the outer ends of said first mentioned one winding and the other of said other two windings.

2. A method of impulse testing three ostensibly identical windings connected in Y relationship amongst three winding terminals and a neutral terminal comprising simultaneously applying impulses of opposite polarity and equal voltage and wave shape to two winding terminals while one of the remaining terminals is connected to ground through a voltage sensitive device, and then simultaneously applying impulses of opposite polarity and equal voltage and wave shape to another two winding terminals while one of the remaining terminals is connected to ground through a voltage sensitive device.

3. A method of impulse testing three identical insulated electrical windings connected together in Y-relationship, said method comprising connecting the neutral of said Y-relationship to ground through an impedance shunted by a voltage sensitive device and then simultaneously applying impulses of opposite polarity and equal voltage and wave shape to the outer ends of two of said three windings, and then simultaneously applying impulses of opposite polarity and equal voltage and wave shape to the outer ends of the third of said three windings and one of said two windings.

4. A method of impulse testing three identical insulated electrical windings connected together in Y-relationship, said method comprising connecting the neutral of said Y-relationship to ground through a voltage sensitive device, simultaneously applying impulses of opposite polarity and equal voltage and wave shape to the outer ends of two of said windings, and then simultaneously applying impulses of opposite polarity and equal voltage and wave shape to the outer ends of one of said two windings and the third of said three windings.

5. A method of impulse testing three identical insulated electrical windings connected together in Y-relationship, said method comprising connecting the outer end of one of said windings to ground through a voltage sensitive device, and simultaneously applying impulses of opposite polarity and equal voltage and wave shape to the outer ends of the other two of said three windings, and then connecting the outer end of one of said other two windings to ground through a voltage sensitive device and repeating said simultaneous impulsing at the outer ends of said first mentioned one winding and the other of said other two windings.

6. A method of impulse testing three identical insulated electrical windings connected together in Y-relationship, said method comprising connecting the outer end of one of said windings to ground through an impedance shunted by a voltage sensitive device, and simultaneously applying impulses of opposite polarity and equal voltage and wave shape to the outer ends of the other two of said three windings, and then connecting the outer end of one of said other two windings to ground through an impedance shunted by a voltage sensitive device and repeating said simultaneous impulsing at the outer ends of said first mentioned one winding and the other of said other two windings.

7. A method of impulse testing the electrical windings of a three phase transformer when both the high and low voltage sections of said electrical windings are connected in delta-relationship, said method comprising connecting two terminals of one of said delta-relationships to ground, connecting a voltage sensitive device to the two terminals of the other of said delta-relationships corresponding to said first mentioned two terminals and applying an impulse of predetermined voltage and wave shape to the remaining terminal of said one delta-relationship and then connecting another two terminals of said one delta-relationship to ground, connecting a voltage sensitive device to the two terminals of said other delta-relationship corresponding to said another two terminals, and applying an impulse of predetermined voltage and wave shape to the remaining terminal of said one delta-relationship.

8. A method of impulse testing the electrical windings of a three phase transformer when both the high and low voltage sections of said electrical windings are connected in delta-relationship amongst three terminals, said method comprising connecting two terminals of one of said delta-relationships to ground through equal impedances, connecting a voltage sensitive device to the two terminals of the other of said delta-relationships corresponding to said two terminals of said one delta-relationship and applying an impulse of predetermined voltage and wave shape to the remaining terminal of said one delta-relationship, and then connecting another two terminals of said one delta-relationship to ground through equal impedances, connecting a voltage sensitive device to the two terminals of said other delta-relationship corresponding to said another two terminals, and applying an impulse of predetermined voltage and wave shape to the remaining terminal of said one delta-relationship.

9. A method of impulse testing the electrical windings of a three phase transformer when one of the ostensibly identical three winding sections of said electrical windings are connected in delta-relationship and the other ostensibly identical three winding sections of said electrical windings are connected in Y-relationship, said method comprising connecting two terminals of said delta-relationship and the neutral terminal of said Y-relationship to ground, and applying an impulse of predetermined voltage and wave shape to the remaining terminal of said delta-relationship while the outer ends of the two winding sections of said Y-relationship which correspond to the two winding sections of said delta-relationship which are connected between said two terminals and said remaining terminal are connected to ground through a voltage sensitive device, and then connecting another two terminals of said delta-relationship to ground and applying an impulse of predetermined voltage and wave shape to the remaining terminal of said delta-relationship while the outer ends of the two winding sections of said Y-relationship which correspond to the two winding sections of said delta-relationship which are connected between said another two terminals and said last mentioned remaining terminal are connected to ground through a voltage sensitive device.

10. A method of impulse testing the electrical windings of a three phase transformer having three ostensibly identical insulated electrical winding sections connected amongst three terminals in delta-relationship and three ostensibly identical insulated electrical winding sections connected together at a neutral terminal in Y-relationship, said method comprising connecting two of said three terminals to ground through equal impedances, connecting a voltage sensitive device to said neutral terminal and to the outer ends of the two winding sections of said Y-relationship corresponding to the two winding sections of said delta-relationship which are connected to the remaining terminal of said three terminals through a voltage divider comprising two equal impedances, and applying an impulse of predetermined voltage and wave shape to said remaining terminal, and then connecting another two of said three terminals to ground through equal impedances, connecting a voltage sensitive device to said neutral terminal and to the outer ends of the two winding sections of said Y-relationship corresponding to the two winding sections of said delta-relationship which are connected to the remaining terminal of said three terminals through a voltage divider comprising two equal impedances, and then applying an impulse of predetermined voltage and wave shape to said last mentioned remaining terminal.

11. A method of impulse testing the high voltage electrical windings of a three phase transformer having three ostensibly identical insulated high voltage winding sections connected in delta-relationship amongst three terminals and three ostensibly identical insulated low voltage winding sections, said method comprising connecting two of said terminals to ground through equal impedances, grounding one end of the two low voltage sections corresponding to the two high voltage sections having their ends connected to the remaining terminal of said three terminals, connecting voltage sensitive means to the other ends of said two low voltage sections for detecting an unbalance in the voltages induced therein when an impulse of predetermined voltage and wave shape is applied to said third terminal, and applying said impulse to said third terminal, and then connecting another two of said terminals to ground through equal impedances, grounding one end of the two low voltage sections corresponding to the two high voltage sections having their ends connected to the remaining terminal of said three terminals, connecting voltage sensitive means to the other ends of said last mentioned two low voltage sections, and applying an impulse of predetermined voltage and wave shape to said last mentioned remaining terminal.

12. A method of impulse testing the electrical windings of a three phase transformer having three ostensibly identical insulated high voltage winding sections and three ostensibly identical low voltage winding sections when one of said three sections are Y-connected, said method comprising connecting a grounded voltage sensitive device to one end of two of said Y-connected sections and simultaneously applying impulses of opposite polarity and equal voltage and wave shape to said two sections, and then connecting a grounded voltage sensitive device to one end of another two of said Y-connected sections and simultaneously applying impulses of opposite polarity and equal voltage and wave shape to said another two sections.

References Cited in the file of this patent

UNITED STATES PATENTS

| | | |
|---|---|---|
| 1,901,701 | Coffin | Mar. 14, 1933 |
| 2,321,424 | Rohats | June 8, 1943 |
| 2,479,426 | Stewart et al. | Aug. 16, 1949 |

OTHER REFERENCES

Race: "General Electric Review," August 1941, pp. 445–450.

Rohats et al.: "General Electric Review," September 1951, pp. 51–55.

Shipley: "Allis-Chalmers Electrical Review," second quarter, 1954, pp. 30–34.